(12) United States Patent
Chen et al.

(10) Patent No.: US 7,069,348 B2
(45) Date of Patent: Jun. 27, 2006

(54) SYSTEM AND METHOD FOR DATA TRANSMISSION USING PIO ACCELERATOR DEVICE IN AN IDE CONTROLLER

(75) Inventors: Chung-Heng Chen, Taipei (TW); Ying-Lang Chuang, Kaohsiung (TW)

(73) Assignee: Via Technologies, Inc. (TW)

( * ) Notice: Subject to any disclaimer, the term of this patent is extended or adjusted under 35 U.S.C. 154(b) by 791 days.

(21) Appl. No.: 10/079,567

(22) Filed: Feb. 22, 2002

(65) Prior Publication Data

US 2002/0129179 A1    Sep. 12, 2002

(30) Foreign Application Priority Data

Mar. 9, 2001   (TW) ............................... 90105636 A

(51) Int. Cl.
*G06F 3/00* (2006.01)
*G06F 13/28* (2006.01)

(52) U.S. Cl. ..................... 710/14; 710/22; 710/36; 710/52; 710/60

(58) Field of Classification Search .............. 710/14, 710/22, 36, 52, 60
See application file for complete search history.

(56) References Cited

U.S. PATENT DOCUMENTS

| | | | | |
|---|---|---|---|---|
| 5,671,439 A | * | 9/1997 | Klein et al. ................ 710/1 |
| 5,678,064 A | * | 10/1997 | Kulik et al. ................ 710/28 |
| 5,953,352 A | * | 9/1999 | Meyer ........................ 714/820 |
| 6,263,390 B1 | * | 7/2001 | Alasti et al. ................ 710/308 |
| 2001/0030561 A1 | * | 10/2001 | Asano et al. ............... 327/170 |

FOREIGN PATENT DOCUMENTS

CN    1369795 A    9/2002

* cited by examiner

*Primary Examiner*—Kim Huynh
*Assistant Examiner*—Alan S. Chen
(74) *Attorney, Agent, or Firm*—Sughrue Mion, PLLC

(57) ABSTRACT

A system and method for upgrading data transmission performance under programmed input/output (PIO) mode is disclosed. In one embodiment, a PIO accelerating device is established in an IDE controller for handling data transmissions concerned with read/write operations after taking over associated control right from processing unit. A counter is configured in the PIO accelerating device for varying its stored content followed by a predetermined sequence in responsive to the input pulses of a system clock. A timing signal generator is also established in the PIO accelerating device for issuing signals directed to the IDE device and the buffer in the IDE controller for activating associated data transmission operations while the stored content reaches to a predetermined threshold. Optimal performance to data transmission under IO mode 4 of the PIO mode can be achieved by employing the disclosed hardware configuration.

10 Claims, 3 Drawing Sheets

SYSTEM AND METHOD FOR DATA TRANSMISSION USING PIO ACCELERATOR DEVICE IN AN IDE CONTROLLER

FIELD OF THE INVENTION

The present invention relates to a system and method for upgrading data transmission performance of the integrated device electronic (IDE) interface. More particularly, the present invention relates to a system and method for accelerating data transmission speed of the IDE interface based on a programmed input/output (PIO) protocol.

BACKGROUND OF THE INVENTION

Chipsets of the modern computer systems become a broadly used device for controlling data read/write operations from/to IDE devices because IDE standards offer many useful advantages. Those advantages, such as low cost, excellent compatibility, and easy for set up, bring on the IDE bus to be one of the most popular interfaces.

PIO and direct memory access (DMA) are two commonly used approaches (modes) for data transmission, and every one aforementioned can be selected for transferring data with the IDE devices via the IDE interface. Both of the PIO and DMA modes can establish paths for delivering data via the IDE interface between the host systems and the IDE devices.

In the PIO modes, the processing unit of the host system generates input/output (I/O) commands for activating relative read or write operations between the IDE devices and the memory or between the IDE devices and other interfaces under controlled by the chipset of the host system.

The PIO input/output (IO) modes consist of:

IO mode 0: The maximum rate for data transmission is 3.3 MB/sec

IO mode 1: The maximum rate for data transmission is 5.2 MB/sec

IO mode 2: The maximum rate for data transmission is 8.3 MB/sec

IO mode 3: The maximum rate for data transmission is 11.1 MB/sec

IO mode 4: The maximum rate for data transmission is 16.6 MB/sec

The higher number of the I/O mode indicates the better efficiency of the data transmission under the IDE interface.

The read and write operations under the PIO modes are briefly illustrated below. In the reading steps of the PIO modes, the processing unit issues read commands to the chipset, while the chipset accesses data from the IDE device and then puts the accessed data into memory for the use of the processing unit. Under writing steps of the PIO modes, the processing unit issues write commands to drive the chipset to retrieve data from the memory, while the retrieved data is then put into the indicated IDE device. Conventionally, associated interrupts are issued for activating data transmission for read or write operations under PIO modes.

FIG. 1 is a diagram illustrative of the data transmission operations in the conventional IDE interface system. In this firmware configuration under PIO mode, operating system 10 transfers data in responsive to a write command via the PCI interface 20 or other interfaces 30 (such as IEEE 1394, USB interface) into the IDE controller 40 under the PIO modes. A buffer 42 in the IDE controller 40 is used for temporarily storing the transferred data while—the data stored in the buffer 42 is finally delivered to the IDE device 50 via the IDE interface 60. Additionally, when a read command is issued, the data indicated by the read command in the IDE device 50 is transferred into the buffer 42 via IDE interface 60 and the firmware control interface 44. The transferred data is then delivered out of the IDE controller 40 via the PCI interface 20 or other interfaces 30 for the use of the processing unit. As noted, firmware control interface 44 handles data transmissions activated by interrupts between the IDE device 50 and the PCI interface 20 or the other interface 30. However, to activate interrupts for starting read or write operations significantly burdens firmware loading and affects data transmission performance.

Associated firmware will be driven for handling data transmission under the PIO modes as mentioned above. Basically, the transmission cycle time is about 120 ns (nanoseconds) under IO mode 4 of the PIO modes. Therefore one read/write (IOR/IOW) operation should be completed within 120 ns in order to achieve the purpose of most efficiently transferring data in and out of the IDE device 50 via the IDE interface 60. Unfortunately, the above requirement is seldom accomplished because the conventional firmware configuration manipulating data transmission is usually limited by the performance of the processing unit. This implies that the required data may not be delivered following the fastest transmission speed under the IO mode 4.

SUMMARY OF THE INVENTION

It is therefore an object of this invention to provide a system and method that upgrades data transmission performance by means of hardware configurations. The present invention provides a PIO accelerating device to accelerate data transmission speed of the IDE interface whatever IO mode of the PIO modes is employed. The disadvantage that the transmission speed of the IDE interface is limited under firmware configuration can be eliminated in the disclosed invention.

It is another object of this invention to disclose the system and method by means of accelerated PIO hardware so that the IDE interface can transfer data under most efficiently transmission speed supported by every PIO mode.

In one embodiment of the invention, the disclosed system encompasses at least one data interface, an IDE controller, and an IDE device, wherein the IDE controller coupled to the interface for controlling data transmission from/to the IDE device via IDE interface. The IDE controller of the embodiment includes a buffer, a firmware control interface, and a PIO accelerating device, wherein the PIO accelerating device further includes a counter and a timing signal generator. The buffer couples to the data interfaces for accepting and temporarily storing the data therefrom, or for temporarily storing the data retrieved from the IDE device. The firmware control interface in the IDE controller couples to the PIO accelerated device and the buffer to control the data transmission operations with the IDE device. However, the processing unit transfers a control right for data transmission to the disclosed PIO accelerating device to perform data transmissions required for under read and write operations. The PIO accelerated device couples with the firmware control interface and the IDE device to periodically issue associated signals for activating data transmissions under the IO mode 4 while taking over the control right. Therefore data stored in the buffer should be transferred into the IDE device in responsive to associated write commands, or contrarily, the retrieved data will be delivered from the IDE device and then stored in the buffer in responsive to associated read commands. The PIO accelerating device returns the control right back to the processing unit and notifies the firmware control interface to continue the consecutive operations after the data transmissions are completed by the PIO accelerating device.

In the embodiment, the counter in the PIO accelerating device varies its state or content stored therein followed by a predetermined sequence in responsive to the input pulses of a system clock. The counter issues triggering signals directed to the timing signal generator when the stored content reaches a predetermined threshold. Associated read or write operations can be started in responsive to the triggering signals periodically. The timing signal generator issues signals directed to the IDE device and the buffer in the IDE controller if a data transmission operation is required, therefore the way for data transmission between the buffer and said IDE device can be established and achieved by using hardware configuration.

BRIEF DESCRIPTION OF THE DRAWINGS

The foregoing aspects and many of the attendant advantages of this invention will become more readily appreciated as the same becomes better understood by reference to the following detailed descriptions, when taken in conjunction with the accompanying drawings, wherein.

DETAILED DESCRIPTION OF THE PREFERRED EMBODIMENT

Figure 1:
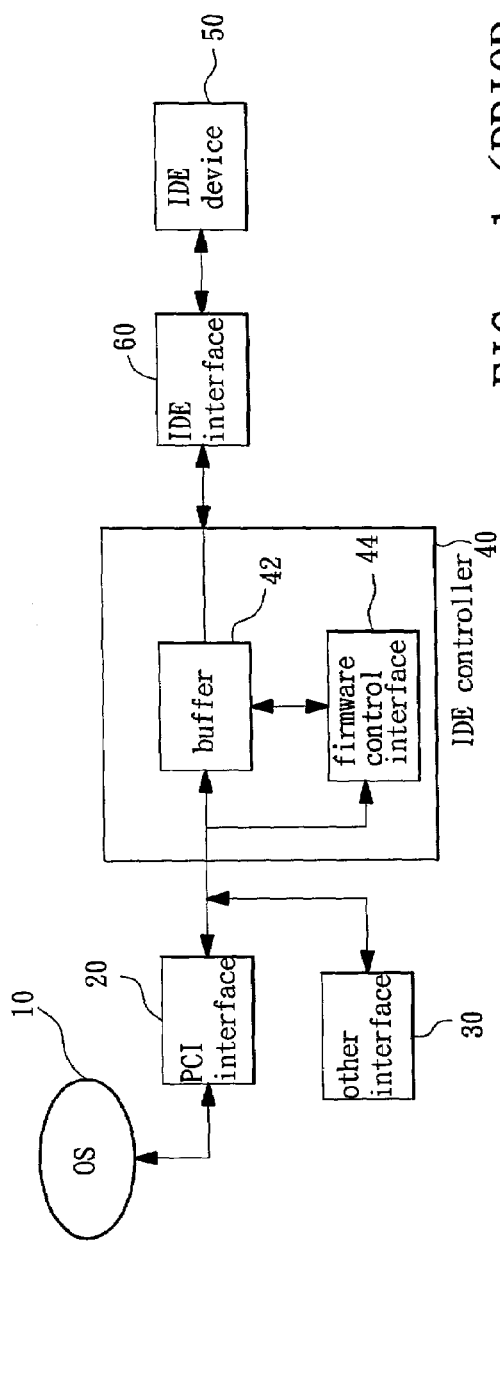
FIG. 1 is a schematic diagram for showing the system configuration of the conventional IDE interface.
Figure 2:
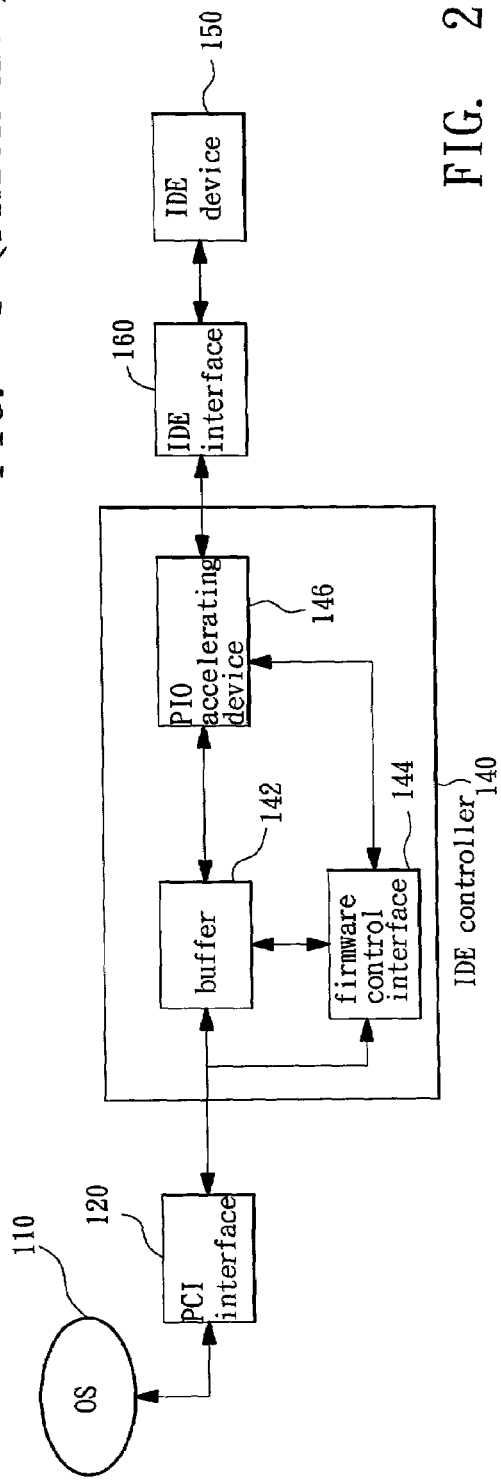
FIG. 2 is a schematic diagram for showing the system configuration of data transmission between an IDE interface and a PCI interface via the PIO accelerating device.
Figure 3:
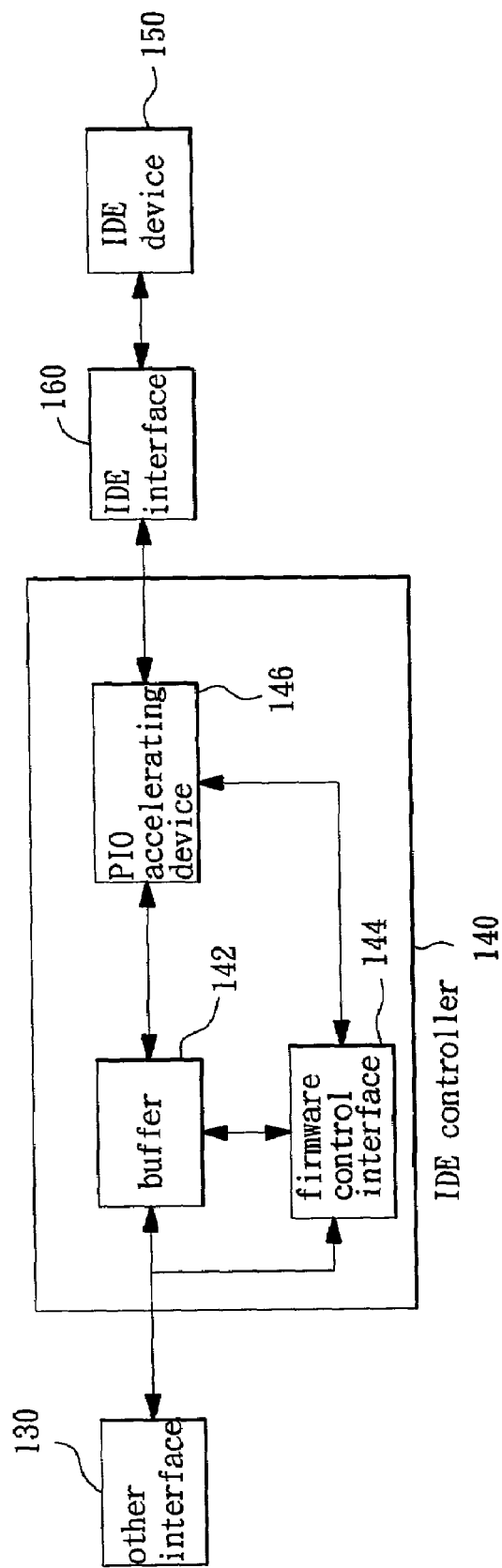
FIG. 3 is a schematic diagram for showing the system configuration of data transmission between an IDE interface and other interfaces via the PIO accelerating device.

Referring to FIG. 2, a schematic diagram shows the system configuration of the IDE interface of the present invention. The present invention provides a PIO accelerating device 146 in the IDE controller 140 for handling data transmission relative to the read/write commands under the IO mode 4 of the PIO modes. The processing unit (not shown) sets up the IO mode needed for data transmission firstly. OS (Operating system) 110 then transmits data to the IDE controller 140 through the PCI interface 120 in responsive to a write command, while the transmitted data is temporarily stored in the buffer 142 of the IDE controller 140. After the control right for data transmission is transferred from the processing unit to the PIO accelerating device 146, the data in buffer 142 is directed to the IDE device 150 through the IDE interface 160. The PIO accelerating device 146 returns the control right back to the processing unit while it completes data transmission operations. Additionally, after the processing unit generates required read command, the control right for data transmission will be transferred to the PIO accelerating device 146 for retrieving data indicated by the read command from the IDE device 150 through the IDE interface 160. The PIO accelerating device 146 returns the control right back to the processing unit when the retrieved data is transferred and stored into the buffer 142. Finally the retrieved data can be directed out of the IDE controller 140 via the PCI interface 120 for the use of the processing unit. The IDE firmware controller 144 still monitors the read/write operations as conventional, however, associated data transmission operations are actually performed by the PIO accelerating device 146 in the embodiment. Notably, the disclosed PIO accelerating device 146 is configured by hardware (will be described later) so that the data transmission speed can be significantly accelerated.

Any person skilled in the art recognizes that the processing unit can achieve speed requirements of the IO mode 0, 1, 2, and 3 by using firmware conventionally. That is, the speed in which the processing unit generates the read/write commands can achieve the need of the above four PIO modes completely. The read/write commands can be used to drive data exchange between the buffer 142 and the IDE device 150 by means of the firmware control interface 144. Under the IO mode 4, the control rights for data transmission will be transferred to the PIO accelerating device 146 to improve data transmission efficiency.

Similarly, the PIO accelerating device 146 can be used for data transmission between the IDE interface 160 and the other interfaces 130 under the IO mode 4 as shown in FIG. 2, wherein the other interfaces 130 could be the USB interface or the IEEE 1394 interface, etc. Under control of the PIO accelerating device 146, the data transmission with the IDE device 150 under IO mode 4 should have better performance than before.

Figure 4:
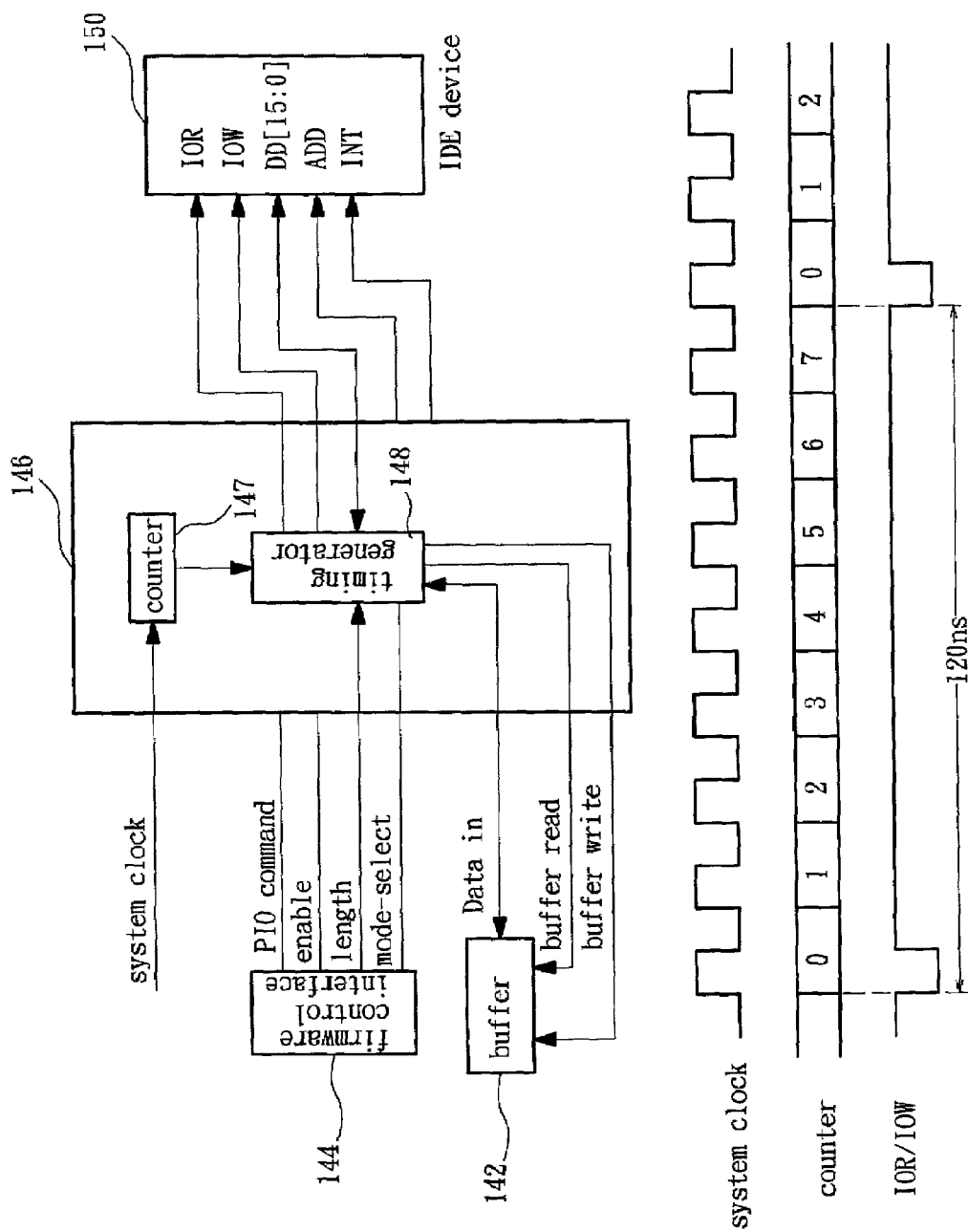
FIG. 4 is a schematic diagram for showing the detail configuration of the PIO accelerating device in the IDE interface according to the present invention.

Referring now to FIG. 4, a detailed configuration of the PIO accelerating device 146 is shown. For the sake of briefly describing the operations of the PIO accelerating device 146, the IDE interface 160 in FIG. 2 is eliminated from FIG. 4. The PIO accelerating device 146 couples to the firmware control interface 144 via the lines for delivering the PIO commands, enable signals, length, and mode-select signals. The PIO accelerating device 146 and the buffer 142 are connected via the lines for transferring the data in, buffer read, and buffer write signals. The PIO accelerating device 146 and the IDE device 150 are connected via the lines for directing IOR, IOW, DD [15:0], ADD, and INT signals. Furthermore, a system clock is directed to the PIO accelerating device 146 for the purpose of driving associated operations.

The PIO accelerating device 146 includes at least a counter 147 and a timing generator 148. The counter 147 counts the occurrences of the input pulses of the system clock and varies its states (or content stored therein) by following a predetermined ascending sequence, e.g., 0, 1, 2, . . . ,7 in the embodiment (a predetermined descending sequence is another alternative). A triggering signal is issued to the timing generator 148 when the content stored in counter 147 reaches to a predetermined threshold. For example, a logic 0 (logic 1 is an alternative for some other applications) shown in IOR/IOW lines of FIG. 4 is issued for allowing an IOR/IOW operation from performing. In other word, the data transmission may be activated while logic 0 is issued if there is an IOR/IOW operation must be performed. The timing generator 148 further connects to the length, mode-select, data in, buffer read, buffer write, IOR, IOW, DD[15:0], ADD, and INT lines as shown in FIG. 4. As noted, the aforementioned lines shown in FIG. 4 for delivering commands and signals all operate under well-known IDE standards.

When the PIO accelerating device 146 is enabled and IO mode 4 is selected by the firmware controlled interface 144 respectively via the enabled signal and mode-select lines, the PIO accelerating device 146 transmits associated commands or signals through to the IDE device 150. Data length associated with each read/write command is then determined by using the message from the length line connected between the PIO accelerating device 146 and the firmware control interface 144.

At the same time, the counter 147 starts to count the occurrences of the input pulses of the system clock and varies the stored content by following the predetermined ascending sequence. According to the embodiment of the present invention, the threshold—is 7 (when the system clock is 66MHz) and the PIO accelerating device 146 will be triggered when the counter 147 reaches to the threshold. The timing generator 148 issues an IOR or IOW signal for allowing IOR or IOW operations with the IDE device 150. When an LOR signal is issued, a buffer write signal is also issued to the buffer 142 for driving the data in the IDE device 150 to be stored in the buffer 142 from the lines DD [15:0] through the data in signal lines. When an IOW signal is issued, a buffer read signal is also issued to the buffer 142 for driving the data in the buffer 142 to be directed to the IDE device 150 via DD [15:0] and DD signal lines shown in FIG. 4. As noted, JOR or lOW commands of the embodiment are issued in responsive to the content stored in the counter 147 that is varied as the input pulses of the system clock under IO mode 4. Appropriate designs to the counter 147 for triggering the PIO accelerating device 146 are given by referring the system clock frequency, for example, the threshold 7 is employed when the system clock frequency is 66MHz in the embodiment. The data transmission speed is obviously optimized for achieving the requirements of IO mode 4. Additionally, all data transmissions for read or write operations may be periodically arisen or performed while the triggering signal is issued according to the embodiment, which indicates that any read or write operation may be allowed while the triggering signal is generated. Data transmission performance is significantly upgraded due to no interrupt is required under the disclosed hardware configuration.

Several advantages offered by this invention. Firstly, a PIO accelerating device is employed for upgrade data transmission performance by using hardware configuration. The present invention establishes a PIO accelerating device in the IDE controller to efficiently accelerate the data transmission speeds. Furthermore, the disadvantage of unsatisfied data transmission performance due to heavy firmware loading is eliminated. Secondly, optimized data transmission performance for IDE device under IO mode 4 is achieved by employing the PIO accelerating device disclosed in the embodiment.

As is understood by a person skilled in the art, the foregoing preferred embodiments of the present invention are illustrated by the present invention rather than limitations of the present invention. It is intended to cover various modifications and similar arrangements included within the spirit and scope of the appended claims, the scope of which should be accorded the broadest interpretation so as to encompass all such modifications and similar structure.

What is claimed is:

1. A system for upgrading data transmission performance of an integrated device electronics (IDE) interface under PIO (programmed input/output) modes including:
    an data interface;
    an IDE device; and
    an IDE controller coupled between said interface and an IDE device for transmitting data between said data interface and said IDE device, wherein said IDE controller includes a PIO accelerating device for issuing a triggering signal for activating a data transmission associated with a read operation or a write operation when a predetermined threshold is reached, said PIO accelerating device includes:
        a counter for varying a content stored in said counter according to a predetermined sequence, wherein said triggering signal is issued when said stored content reaches said predetermined threshold; and
        a timing generator being responsive to said stored content for starting said read operation or said write operation.

2. The system according to claim 1, wherein said counter varies said stored content by following said predetermined sequence in response to input pulses of a system clock.

3. The system according to claim 1, wherein said predetermined threshold is designed according to a frequency of said system clock for optimizing said data transmission under IO mode 4 of said PIO mode.

4. The system according to claim 1, wherein said IDE controller includes:
    a buffer coupled with said data interface and said PIO accelerating device for temporarily storing a write data from a host system for storing into said IDE device, or for temporarily storing a read data from said IDE device for the use of the host system; and
    a firmware control interface coupled with said buffer, said data interface, and said PIO accelerating device for controlling said read operation or said write operation between said data interface and said IDE device.

5. The system according to claim 1, wherein said PIO accelerating device takes over a control right for data transmission from a processing unit when said read operation or said write operation needs to be performed.

6. The system according to claim 5, wherein said POI accelerating device returns said control right for data transmission back to said processing unit when a data transmission associated with said read operation or said write operation is performed.

7. The system according to claim 1, wherein said data interface is a PHI interface, an IEEE 1394 interface, or a SUB interface.

8. A method for upgrading data transmission performance of an integrated device electronics (RIDE) interface under PLOD (programmed input/output) modes including:
    transferring a control right for data transmission from a processing unit to a POI accelerating device;
    periodically issuing a triggering signal indicative of an allowance for performing a read operation or a write operation to an RIDE device by said POI accelerating device, wherein said triggering signal is issued when a stored content in said POI accelerating device reaches to a predetermined threshold; and
    transferring said control right to said processing unit while said read operation or said write operation is completed by said POI accelerating device.

9. The method according to claim 8, wherein said stored content varies in response to input pulses of a system clock.

10. The method according to claim 8, wherein said predetermined threshold is designed according to a frequency of said system clock for optimizing said data transmission under BIO mode 4 of said POI mode.

* * * * *

UNITED STATES PATENT AND TRADEMARK OFFICE
CERTIFICATE OF CORRECTION

PATENT NO.          : 7,069,348 B2                                          Page 1 of 1
APPLICATION NO.     : 10/079567
DATED               : June 27, 2006
INVENTOR(S)         : Chen et al.

It is certified that error appears in the above-identified patent and that said Letters Patent is hereby corrected as shown below:

Column 5, line 60, "an" should be --a--.

Column 6, line 44, "(RIDE)" should be --(IDE)--.

Column 6, line 45, "PLOD" should be --PIO--.

Column 6, line 47, "POI" should be --PIO--.

Column 6, line 50, "(RIDE)" should be --(IDE)--.

Column 6, line 50, "POI" should be --PIO--.

Column 6, line 52, "POI" should be --PIO--.

Column 6, line 56, "POI" should be --PIO--.

Column 6, line 62, "BIO" should be --PIO--.

Column 6, line 62, "POI" should be --PIO--.

Signed and Sealed this

Sixteenth Day of September, 2008

JON W. DUDAS
*Director of the United States Patent and Trademark Office*